(12) United States Patent
Hou et al.

(10) Patent No.: US 6,371,158 B1
(45) Date of Patent: Apr. 16, 2002

(54) HYDRAULIC SYSTEM SUMP STANDPIPE

(75) Inventors: Yifei Raymond Hou, Waterloo; Derek Malcolm Eagles, Cedar Falls, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/678,037

(22) Filed: Oct. 3, 2000

(51) Int. Cl.[7] ................................................ F17D 1/00
(52) U.S. Cl. ............................ 137/565.37; 137/561 A; 137/590; 60/487
(58) Field of Search .............................. 137/561 A, 590, 137/565.37; 60/487

(56) References Cited

U.S. PATENT DOCUMENTS

| | | | | |
|---|---|---|---|---|
| 2,532,379 A | | 12/1950 | Trom | |
| 2,946,345 A | * | 7/1960 | Weltmer | 137/590 |
| 3,082,784 A | | 3/1963 | McMath | 137/207 |
| 3,314,544 A | * | 4/1967 | Rosaen | 137/590 |
| 3,881,506 A | | 5/1975 | Hazen | 137/592 |
| 4,681,129 A | * | 7/1987 | Juzi et al. | 137/154 |
| 4,890,644 A | | 1/1990 | Hoeptner, III et al. | 137/590 |
| 5,176,174 A | * | 1/1993 | Torraason | 137/590 |
| 5,375,618 A | * | 12/1994 | Giannesini | 137/110 |
| 5,392,806 A | * | 2/1995 | Gallant | 137/236.1 |
| 5,592,969 A | * | 1/1997 | Reichert | 137/592 |

* cited by examiner

Primary Examiner—A. Michael Chambers

(57) ABSTRACT

A hydraulic system having a standpipe in a sump with ports on the side of the standpipe and one smaller port on the top of the standpipe. The majority of the oil flows into the standpipe through the side ports thereby reducing the downward suction and flow at the top of the standpipe to eliminate the formation of a vortex at the top of the standpipe. As a result, less air is drawn into the oil producing a more consistent oil/air mixture and more consistent sump oil level.

4 Claims, 1 Drawing Sheet

HYDRAULIC SYSTEM SUMP STANDPIPE

BACKGROUND OF THE INVENTION

1. Field of the Invention

The present invention relates to a sump standpipe for use in a hydraulic system and in particular to a sump standpipe having a side inlet port as well as a top inlet port to eliminate the formation of a vortex above the standpipe and achieve a stable oil level control.

2. Description of Related Art

When a tractor transmission shares oil with the rest of the vehicle hydraulic system, such as an axle lubricating system and a hydraulic steering system, the transmission sump oil has to be circulated or mixed with the oil in the rest of the hydraulic system. The oil level in the transmission sump has to be constantly maintained at an optimized level to reduce windage power loss from high-speed gears turning in the oil and to meet the transmission pump suction requirements.

The conventional approach to maintaining the oil level in the sump is to install a standpipe in the transmission sump that connects to a transfer pump inlet. Since the transfer pump typically has a greater flow rate than the incoming oil flow to the transmission, the oil level in the transmission sump is pulled down to the approximate height of the standpipe as shown in FIG. 3. Due to downward suction around the standpipe inlet, a vortex will form in the oil above the standpipe. As soon as a vortex around the standpipe is formed, a large amount of air will be drawn into the transfer pump. This can reduce the oil flow out of the sump to an amount less than the incoming oil flow, causing the oil level in the sump to increase. The oil level will keep increasing until the vortex becomes too deep to maintain, after which the transfer pump will draw in only oil, without any air.

The depth of the vortex will depend on the flow velocity through the standpipe, the amount of air mixed with the oil and the oil viscosity. In a vehicle application, the transfer pump speed can vary greatly during operation due to engine speed variation. Operating temperatures can also vary from −32 to 100° C. At conditions of high oil flow (velocity) and cold oil temperature (high oil viscosity), the depth of the vortex can be as much as 150 mm. The creation of a vortex and its subsequent termination as the oil level increases will cause the flow of oil to the transfer pump to fluctuate between almost all air to all oil. This will cause downstream pressure surges and flow interruptions.

In most cases, the transmission output gear is slightly dipped in sump oil so that the gear teeth can pick up a small amount of oil to lube the gear and provide splash lubrication to other components in the transmission. Increasing the oil level in the sump can cause the output gear to be submerged in the oil. This causes sump oil foaming during high speeds associated with vehicle transport operations that increase windage loss. If the extra flow capacity of the transfer pump cannot make up the drop in efficiency caused by foamy oil, the transmission begins to overfill, leading to an imbalance in the oil level in different components in the hydraulic system.

SUMMARY OF THE INVENTION

To prevent the formation of a vortex, the standpipe of the present invention has ports on the side of the standpipe and one smaller port on the top of the standpipe. The majority of the oil flow is distributed to the two side ports and subsequently, the downward suction flow velocity is reduced. This eliminates a vortex above the standpipe inlet. Since air flows easier through an orifice than does oil, the top port can be sized small enough to reduce the downward oil velocity without restricting the exit of airflow upward through the standpipe.

The new standpipe reduces or eliminates the oil level fluctuation due to engine speed and/or operating temperature changes that would previously have created a vortex. In addition, the standpipe reduces the extent of oil aeration in the transmission system by maintaining oil level at or near the optimum design level under all operating conditions. Controlling the sump oil level at the optimum level will reduce the windage loss and improve transmission pump suction conditions. In hydraulic systems where the fluid output of the transfer pump is utilized for productive uses such as lubrication of other components or cooling, the standpipe of the present invention provides more overall consistency in the oil flow.

DESCRIPTION OF THE PREFERRED EMBODIMENT

Figure 1:
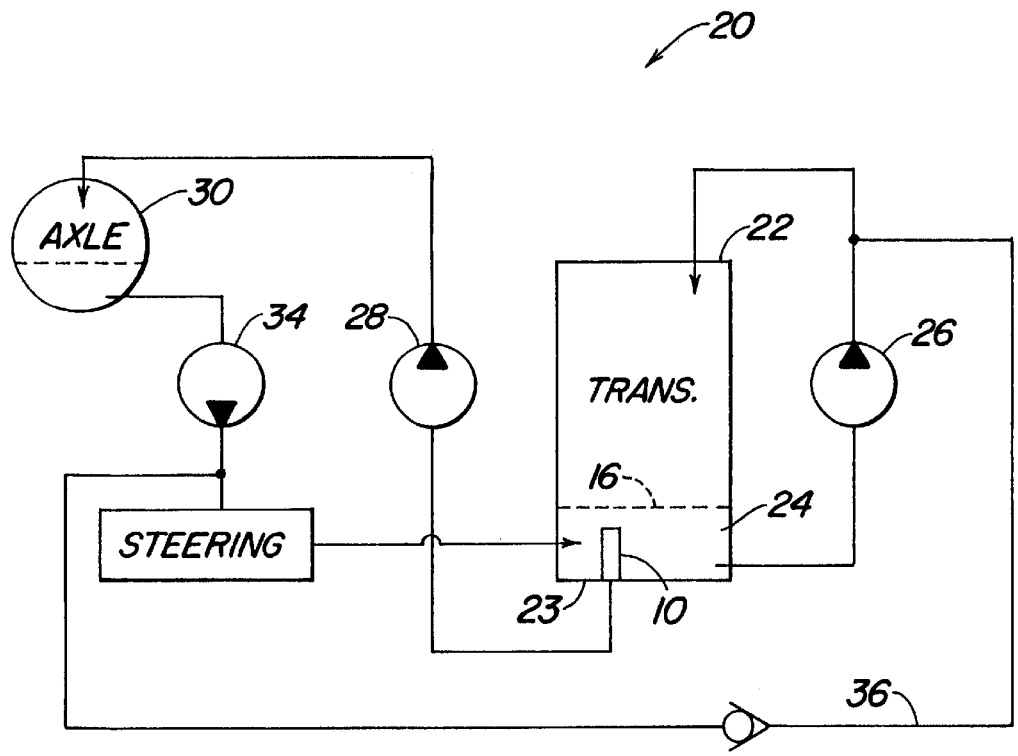
FIG. 1 is a simplified hydraulic system schematic for a vehicle hydraulic system.

With reference to FIG. 1, a vehicle hydraulic system employing the standpipe 10 of the present invention is shown. The hydraulic system is designated generally at 20. The hydraulic system 20 includes a transmission housing 22 having a lower wall 23 and forming an oil sump 24 at the lower end thereof. A transmission lube pump 26 draws oil from the sump 24 and circulates it to the transmission for use in lubricating transmission components.

The hydraulic system includes a transfer pump 28 having an inlet that receives oil from the standpipe 10 in the sump 24. The transfer pump provides oil to lubricate an axle 30 as well as to other hydraulically operated vehicle systems. A steering charge pump 34 receives oil from the axle and uses it to charge a hydraulic steering system. Oil from the steering system is returned to the transmission sump 24. The transmission pump 26 is also used to provide supplemental charge to the steering system through the conduit 36. The hydraulic system 20 shares the oil sump 24 with the transmission for use in providing oil to other hydraulic subsystems in the vehicle. Oil from the axle may also be used to lubricate the PTO gear box before the oil returns to the transmission sump 24.

Figure 2:
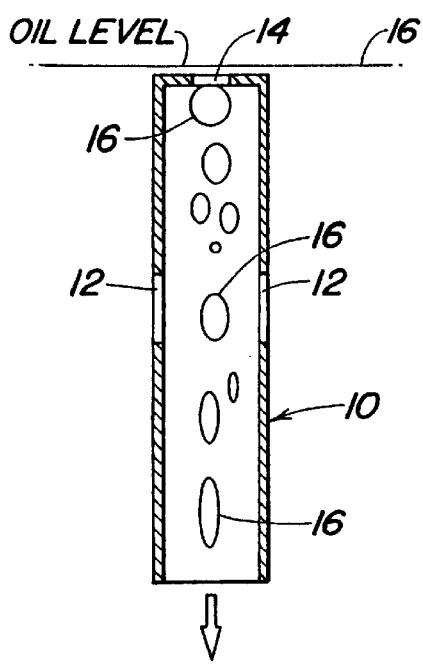
FIG. 2 is an elevational section view of the standpipe of the present invention.
Figure 3:
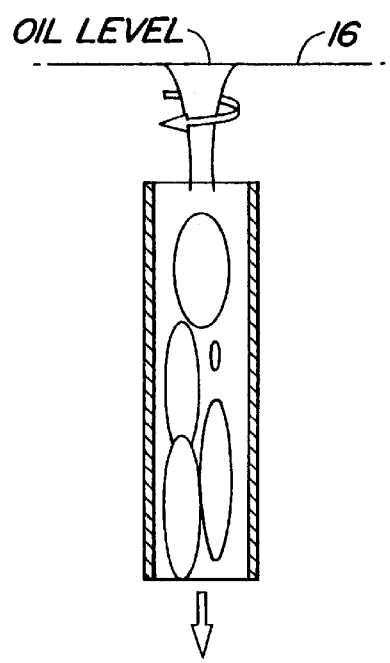
FIG. 3 is an elevational section view of a prior art standpipe.

The standpipe of the present invention is shown in FIG. 2 and designated generally at 10. The standpipe 10 has side inlet ports 12 and a top port 14 at the upper end thereof. The standpipe 10 is disposed in an oil sump having an oil level indicated by the line 16. The diameter of the top port is smaller than the side ports so that the greatest oil flow into the standpipe will occur through the side ports. This reduces the downward flow velocity through the top port 14 compared to a prior art standpipe having a single upper end opening (FIG. 3). As a result, the vortex at the top port can be eliminated. Low oil viscosity and low oil velocity result in the least amount of suction or vacuum at the top port of the standpipe. To ensure that the desired oil level is maintained above the top of the standpipe, the sizes of the ports are based on the minimum flow through the standpipe at the highest operating temperatures.

Some air bubbles 16 will be present in the oil flowing into the standpipe. However, the absence of the vortex, and the large quantity of air drawn into the oil by the vortex, results in an overall more consistent air/oil mixture with the standpipe of the present invention.

The invention should not be limited to the above-described embodiment, but should be limited solely by the claims that follow.

We claim:

1. A hydraulic system for a vehicle comprising:

a housing defining an oil sump;

a pump having an oil inlet and outlet;

a sump standpipe extending upward into the sump through a lower wall of the housing and terminating at an upper end of the standpipe, the standpipe being in communication with the pump inlet for supplying oil to the pump, the standpipe having at least one side port between the lower wall of the housing and the upper end of the standpipe and a top port at the upper end of the standpipe that is smaller in diameter than the at least one side port.

2. The hydraulic system as defined by claim 1 further comprising a transmission lube pump and an axle lube pump both receiving oil from the sump.

3. The hydraulic system as defined by claim 2 further comprising a steering charge pump in series with the axle lube pump.

4. In a vehicle having a transmission with a housing having a lower wall and forming an oil sump at the lower end of the housing and an axle, a hydraulic system comprising:

a transmission lube oil pump and transfer pump;

a sump standpipe extending upward into the sump through a lower wall of the housing and terminating at an upper end of the standpipe, the standpipe being in communication an inlet of the transfer pump, the standpipe further having at least one side port between the lower wall of the transmission housing and the upper end of the standpipe and a top port at the upper end of the standpipe that is smaller in diameter than the at least one side port.

* * * * *